United States Patent [19]

Hardy

[11] 4,331,586

[45] May 25, 1982

[54] NOVEL LIGHT STABILIZERS FOR POLYMERS

[75] Inventor: William B. Hardy, Bound Brook, N.J.

[73] Assignee: American Cyanamid Company, Stamford, Conn.

[21] Appl. No.: 284,882

[22] Filed: Jul. 20, 1981

[51] Int. Cl.³ .................... C07D 401/14; C08K 5/35
[52] U.S. Cl. .................... 525/186; 525/189; 528/423; 544/113; 524/97
[58] Field of Search ............ 260/45.8 NT, 45.8 NP; 525/186; 528/423; 544/113

[56] References Cited

U.S. PATENT DOCUMENTS

| 4,086,204 | 4/1978 | Cassandrini et al. | 260/45.8 NT |
| 4,086,207 | 4/1978 | Cassandrini et al. | 260/45.8 NP |
| 4,104,248 | 8/1978 | Cantatore | 528/423 |
| 4,234,471 | 11/1980 | Wiezer | 260/45.8 NP |
| 4,260,689 | 4/1981 | Rody et al. | 260/45.8 NP |
| 4,265,805 | 5/1981 | Thomas | 260/45.8 NP |

4,294,963 10/1981 Rody .................... 544/113

Primary Examiner—John Kight, III
Assistant Examiner—R. A. White
Attorney, Agent, or Firm—Bruce F. Jacobs

[57] ABSTRACT

Oligomers of the formula

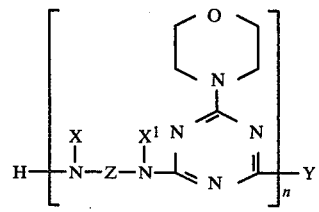

which contain at least one piperidinyl moiety in the repeating unit are useful as light stabilizers for polymers.

12 Claims, No Drawings

NOVEL LIGHT STABILIZERS FOR POLYMERS

This invention relates to certain novel oligomers and to their use as light stabilizers for polymers. More particularly, it relates to novel oligomers of the formula (I)

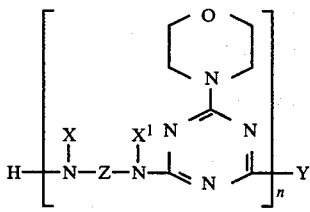

wherein X and $X^1$, which are the same or different, represent hydrogen, $C_1$-$C_{20}$ alkyl, or the radical (II)

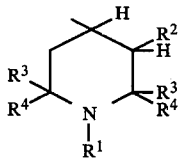

wherein $R^1$ represents hydrogen, $C_2$-$C_3$ hydroxyalkyl, $C_1$-$C_8$ alkyl, hydroxyl, or oxyl; $R^2$ represents hydrogen, $C_1$-$C_8$ alkyl, or benzyl; $R^3$ and $R^4$, which may be the same, or different, represent $C_1$-$C_8$ alkyl, benzyl, or phenethyl, or together with the carbon to which they are attached form a $C_5$-$C_{10}$ cycloalkyl; Z represents $C_2$-$C_{20}$ alkylene, either straight-chained or branched, wherein the alkylene chain may be interrupted by oxy, thio, or

radicals, wherein $R^5$ represents hydrogen, $C_1$-$C_{20}$ alkyl, or the radical (II); $C_5$-$C_{10}$ cycloalkylene,

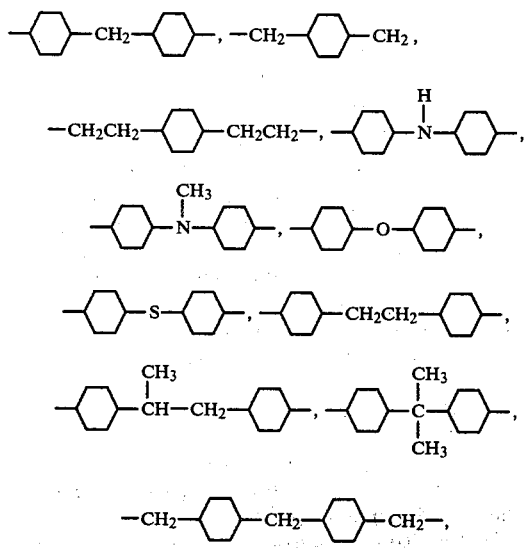

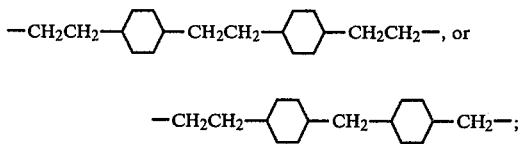

$C_6$-$C_{12}$ arylene, or $C_8$-$C_{14}$ aralkylene; n is an integer greater than 1; and, Y represents a halogen atom, $C_1$-$C_8$ alkylamino, di($C_1$-$C_8$)alkylamino, pyrrolidyl, morpholino, or

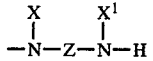

wherein X, $X^1$, and Z are as previously defined; with the proviso that at least one piperidinyl moiety of formula (II) is present in the repeating unit.

The preferred compositions of formula (I) are those wherein both X and $X^1$ are the moiety of formula (II). The especially preferred compositions of formula (I) are those wherein X and $X^1$ are 2,2,6,6-tetramethyl-4-piperidinyl, and Z is hexamethylene.

It is well-known that sunlight and other sources of ultraviolet radiation cause degradation of polymers as evidenced by embrittlement or yellowing of plastic articles made therefrom. It is also well-known that this degradation can be inhibited by use of ultra-violet light stabilizers incorporated in or on such articles.

Cassandrini and Tozzi, U.S. Pat. No. 4,086,204, disclose the stabilization of polymers against degradation by light by the use of polytriazine compounds prepared by reacting a 2,4-dichloro-6-alkylamino-1,3,5-triazine, such as 2,4-dichloro-6-t-octylamino-1,3,5-triazine, and a bifunctional compound containing a tetraalkylpiperidine radical, such as 1,6-bis(2,2,6,6-tetramethyl-4-piperidylamino)hexane. Since these polytriazines have been found to be not completely satisfactory, research continues in order to find compounds, or combinations of compounds, which will be more satisfactory. The present invention arose out of such research and resulted in the discovery of the novel polytriazines of formula (I) which provide improved light stability for polymers in multifilament yarns and films.

The stabilizers of the present invention offer the following advantages:
(1) excellent light-stabilizing activity,
(2) resistance to gas fading,
(3) low volatility/high compatibility,
(4) low extractability from polymers, by laundering or dry cleaning, and
(5) excellent oven-aging stability.

The oligomers of formula (I) may be prepared by reacting equal molecular proportions of a 2,4-dihalo-6-morpholino-1,3,5-triazine (III), such as 2,4-dichloro-6-morpholino-1,3,5-triazine, or 2,4-dibromo-6-morpholino-1,3,5-triazine, and a diamine of formula (IV), wherein X, $X^1$, and Z are as previously defined, as illustrated below, in an inert solvent in the presence of an organic or inorganic base, at an elevated temperature, preferably at the boiling point of the inert solvent.

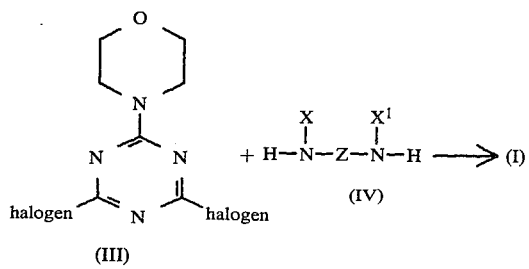

Upon completion of the reaction, the reaction mixture is filtered to separate by-product salts and the solvent is evaporated for the filtrate to obtain a gummy residue which is subsequently extracted in boiling petroleum ether, filtered, and recovered from the filtrate upon evaporation of the petroleum ether.

Suitable inert solvents include toluene, xylene, dioxane, and the like.

Suitable bases include sodium hydroxide, sodium carbonate, sodium bicarbonate, potassium hydroxide, potassium carbonate, potassium bicarbonate, triethylamine, tributylamine, and the like.

The compounds of the formula (III) may be prepared by reacting one molecular proportion of morpholine hydrochloride, with one molecular proportion of a cyanuric halide, preferably cyanuric chloride, in an inert solvent in the presence of an organic, or inorganic base, filtering off by-product salt, and recovering the product from the filtrate.

The diamine is generally prepared by reductively alkylating a 4-oxopiperidine of formula (V) with an appropriate diamine of formula (VI) and hydrogen in the presence of a precious metal catalyst, such as platinum, as shown below.

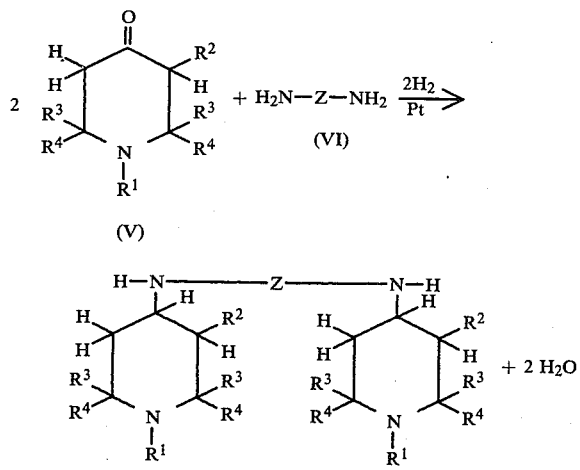

Illustrative examples of suitable diamines of formula (IV) include the following:

4,4'-(dimethylenediimino)bis(2,2,6,6-tetramethylpiperidine),
4,4'-(tetramethylenediimino)bis(2,6-di-n-butyl-2,6-dimethylpiperidine),
4,4'-(hexamethylenediimino)bis(2,2,6,6-tetramethylpiperidine),
4,4'-(thiodiethylenediimino)bis(2,2,6,6-tetraethylpiperidine),
4,4'-(oxydihexamethylenediimino)bis-(2,2,6,6-tetramethylpiperidine),
4,4'-(hexamethylenediimino)bis(1,2,2,6,6-pentamethylpiperidine),
4,4'-(hexamethylenediimino)bis(1-oxyl-2,2,6,6-tetramethylpiperidine),
4,4'-(hexamethylenediimino)bis(1-hydroxy-2,2,6,6-tetramethylpiperidine),
4,4'-(octadecamethylenediimino)bis(2,2,6,6-tetramethylpiperidine),
4,4'-(iminodiethylenediimino)bis(2,2,6,6-tetramethylpiperidine),
4,4'-(1,4-cyclohexylenediimino)bis(2,2,6,6-tetramethylpiperidine),
4,4'-(methylenedi-4,1-cyclohexylenediimino)bis(2,2,6,6-tetramethylpiperidine),
4,4'-[1,4-cyclohexylenebis(methyleneimino)]bis(2-benzyl-2,6,6-trimethylpiperidine),
15,15'-(hexamethylenediimino)bis(7-azadispiro[5.1.5.3-]hexadecane,
4,4'-(1,4-phenylenediimino)bis(2,2,6,6-tetramethylpiperidine),
4,4'-[1,4-phenylenedi(methyleneimino)]bis(2,2,6,6-tetramethylpiperidine),
4,4'-(hexamethylenediimino)bis(2-phenethyl-2,6,6-trimethylpiperidine),
4,4'-(hexamethylenediimino)bis(2,2,3,6,6-pentamethylpiperidine),
4-[(6-aminohexyl)amino]-2,2,6,6-tetramethylpiperidine,
4-[(12-aminododecyl)amino]-2,2,6,6-tetramethylpiperidine,
4-[bis(2-aminoethyl)amino]-2,2,6,6-tetramethylpiperidine,
4-[[2-(2-aminoethoxy)ethyl]amino]-2,2,6,6-tetraethylpiperidine,
4-[(4-aminocyclohexyl)amino]-2,2,3,6,6-pentamethylpiperidine,
and the like.

The preferred diamine of formula (IV) is 4,4'-(hexamethylenediimino)bis(2,2,6,6-tetramethylpiperidine), also known as 1,6-bis(2,2,6,6-tetramethyl-4piperidylamino)hexane, and as N,N'-bis(2,2,6,6-tetramethyl4-piperidyl)hexamethylenediamine, the preparation of which is described in Example 2 of U.S. Pat. No. 4,104,248.

The oligomers of this invention are useful as light stabilizers for thermoplastic substrates such as polyolefins, polyesters, polyethers, polyurethanes, polystyrenes, high-impact polystyrenes, and the like, as films, monofilaments, multifilament yarns, and the like. Preferably, the thermoplastic substrate is a polyolefin.

As used herein, the term "polyolefin" includes homopolymers of alpha olefins such as polyethylene, polypropylene, polybutadiene, polyisoprene, polystyrene, and the like; copolymers of alpha olefins such as ethylene-propylene copolymer, ethylene-butylene copolymer, ethylene-vinyl acetate copolymer, styrene-butadiene copolymer, acrylonitrile-butadiene-styrene terpolymer, and the like. The preferred polyolefin is polypropylene.

Other organic materials susceptible to degradation by the effects of light, the properties of which are improved by the incorporation therein of a compound of this invention, include natural and synthetic rubbers; the latter include, for example, homo-, co-, and terpolymers of acrylonitrile, butadiene and styrene, and blends thereof.

The oligomers of formula (I) are particularly useful in polyolefins, such as polyethylene, polypropylene, polybutylene, and the like, and copolymers thereof.

Generally, the compositions comprise a polymer containing from about 0.1% to about 5% by weight of the compound of formula (I), based on the weight of the polymer.

Preferably, the composition comprises a polyolefin containing from about 0.2% to about 2% by weight of the compound of formula (I), based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'-bis(2,6-di-t-butylphenol); 4,4'-bis(2,6-diisopropylphenol); 2,4,6-tri-t-butylphenol; 2,2'-thiobis(4-methyl-6-t-butylphenol); octadecyl 2(3',5'-di-t-butyl-4'hydroxyphenyl)-propionate, etc; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythrityl diphosphite, diphenyldecyl phosphite, etc; and combinations thereof.

Suitable supplemental light stabilizers include those of the benzotriazole class, such as 2-(2'-hydroxy-5-t-octylphenyl)benzotriazole; 2-(2'-hydroxy-3'-5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-di-methoxybenzophenone; hindered phenol esters, such as n-hexadecyl 3,5-di-t-butyl-4-hydroxybenzoate, and -2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'-thiobis(4-t-octylphenol); nickel complexes of bis(4-toctylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc; nickel complex of 2-hydroxy-4-methylphenyl undecyl ketone oxime, etc. Further illustrative examples of suitable antioxidants and supplemental light stabilizers can be found in columns 3 and 4 of U.S. Pat. Nos. 3,488,290 and 3,496,134 and in the other patents mentioned therein.

As with the oligomer of formula (I), the additive is advantageously employed within the range from about 0.2% to about 2% by weight, based on the weight of the untreated polymer.

The oligomer of formula (I) may be incorporated into the polymeric substrate by any of the known techniques for compounding additives with a polymer. For example, the oligomer of formula (I) and the additive may be compounded by dry blending with the substrate in powder or granular form, followed by milling, Banbury mixing, molding, casting, extruding, swelling, and the like. Alternatively, the oligomer of formula (I) may be added, as a solution or slurry in a suitable inert solvent, or dispersant, to the polymeric substrate in powder or granular form, the whole mixed intimately in a mixer, and the solvent subsequently removed. As a further possibility, the oligomer of formula (I) may be added to the polymeric substrate during the preparation of the latter, for instance at the latex stage of polymer production, to provide prestabilized polymer material.

To incorporate the oligomer of formula (I) in multifilament fibers, the polymer is dry blended with the polymeric substrate and a processing antioxidant, and the blend is extruded and pelletized at an elevated temperature.

Optionally, the spun yarn may be treated with a processing lubricant. Preferably, it is treated with an ethoxylated fatty acid, or an alkoxylated glycol.

The following examples are illustrative of the present invention. All parts and percentages are by weight unless otherwise indicated.

EXAMPLE 1

2,4-Dichloro-6-morpholino-1,3,5-triazine (3.5 grams; 0.015 mole) and sodium carbonate (2.0 grams; 0.03 mole) are slurried in water (75 mls) at 0°–5° C., and 4,4'-(hexamethylenediimino)bis(2,2,6,6-tetramethylpiperidine (6.7 grams; 0.017 mole) is added thereto while stirring rapidly. Upon completion of the addition, the reaction mixture is then slowly heated to reflux whereupon a white thin gum is formed. After refluxing for one hour, morpholine (5 mls) is added to the reaction mixture and refluxing is continued for 18 hours. The supernatant liquid is decanted therefrom and the residual product is washed with water. The washed product is dissolved in hot dioxane (50 mls) and then treated with morpholine (5 mls). The mixture is heated at reflux for 3 hours and filtered. The filtrate is drowned in water and the resulting precipitate is recovered by filtration, washed with water, and dried overnight in a vacuum oven to obtain 7 grams of white powder which softens at 180° C., melts at 220° C., and has a molecular weight of 1300, which corresponds to an n value of 2.33.

EXAMPLE 2

The product of Example 1 (0.25 gram) is dry blended with a mastermix of 100 grams of unstabilized polypropylene (Pro-fax ® 6401) and 0.1 gram of a processing antioxidant, 2,4,6-tri-t-butylphenol. The blend is milled at 350°–370° F. for five minutes, and then compression molded at 400° F. into a film 4–5 mils thick. The film and a control film, identically prepared without the compound under test, are exposed to a carbon arc in an Atlas Fade-Ometer ® until the carbonyl content of the infrared absorption spectrum increases by 0.10-weight percent, a generally accepted point of film embrittlement.

The results obtained are shown below along with the results obtained with a control film.

|  | Hours to Failure |
|---|---|
| Example 2 | 1700 |
| Control | 0–400 |

COMPARISON EXAMPLE

The procedure of Example 2 is followed in every detail except that a polymer of 2,4-dichloro-6-t-octylamino-1,3,5-triazine and 4,4'-(hexamethylenediimino)bis(2,2,6,6-tetramethylpiperidine) is substituted for the product of Example 1. The polymer is that of U.S. Pat. No. 4,086,204 discussed above. The results obtained are shown below:

| | Hours to Failure |
|---|---|
| Comparison Example | 1200 |

Comparison of the results obtain in this comparison example with those obtained in Example 2 shows a 41.6 percent improvement in light stability imparted by the product of the present invention in comparison with the prior art polymer.

What is claimed is:

1. An oligomer of the formula (I)

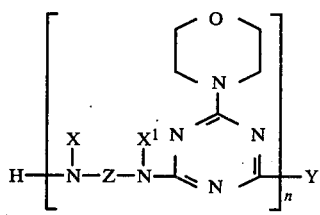

wherein X and $X^1$, which are the same or different, represent hydrogen, $C_1$–$C_{20}$ alkyl, or the radical (II)

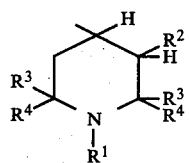

wherein $R^1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, which are the same or different, represent $C_1$–$C_8$ alkyl, benzyl, or phenethyl, or together with the carbon to which they are attached form a $C_5$–$C_{10}$ cycloalkyl; Z represents $C_2$–$C_{20}$ alkylene, either straight-chained or branched, wherein the alkylene chain is optionally interrupted by oxy, thio, or

radicals, wherein $R^5$ represents hydrogen, $C_1$–$C_{20}$ alkyl, or the radical (II); $C_5$–$C_{10}$ cycloalkylene,

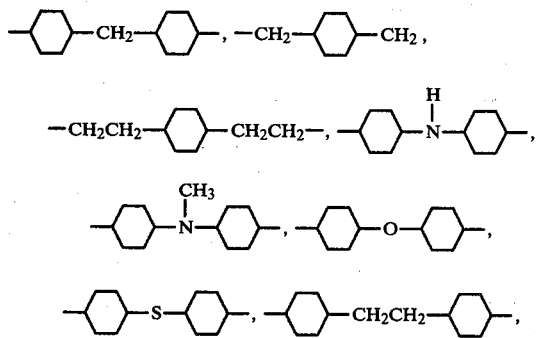

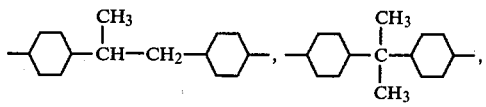

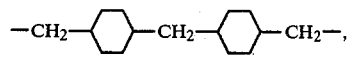

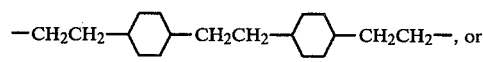

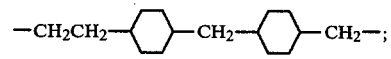

$C_6$–$C_{12}$ arylene, or $C_8$–$C_{14}$ aralkylene; n is an integer greater than 1; and, Y represents a halogen atom, $C_1$–$C_8$ alkylamino, di($C_1$–$C_8$)alkylamino, pyrrolidyl, morpholino, or

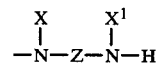

wherein X, $X^1$, and Z are as previously defined; with the proviso that at least one piperidinyl moiety of formula (II) is present in the repeating unit.

2. The oligomer of claim 1 wherein X and $X^1$ are each

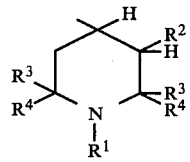

3. The oligomer of claim 2 wherein $R^1$ is hydrogen and $R^2$, $R^3$, and $R^4$ are each methyl.

4. The oligomer of claim 1 wherein Z is $C_2$–$C_{20}$ straight-chained alkylene.

5. The oligomer of claim 3 wherein Z is hexamethylene.

6. A method for stabilizing a polymer which is normally subject to degradation by ultraviolet radiation which comprises incorporating into said polymer an ultra-violet stabilizingly effective amount of an oligomer of claim 1.

7. The method of claim 6 wherein the oligomer is incorporated in a concentration of from about 0.2 to 2% by weight based on the weight of the polymer.

8. The method of claim 6 wherein the polymer is a polyolefin.

9. The method of claim 8 wherein the polyolefin is polypropylene.

10. The method of claim 6 wherein the oligomer is that of claim 2, 3, 4 or 5.

11. The composition produced by the method of claim 6, 7, 8, or 9.

12. The composition produced by the method of claim 6 wherein the oligomer is that of claim 2, 3, 4 or 5.

* * * * *